United States Patent

Brilliant et al.

[11] Patent Number: 5,872,166
[45] Date of Patent: Feb. 16, 1999

[54] OVERBASED PVC STABILIZER

[75] Inventors: Stuart D. Brilliant, Levittown, N.Y.; Kook Jin Bae, Kinnelon, N.J.

[73] Assignee: Witco Corporation, Greenwich, Conn.

[21] Appl. No.: 492,629

[22] Filed: Jun. 20, 1995

[51] Int. Cl.$^6$ ............................. C08K 5/3492; C08K 5/09
[52] U.S. Cl. ..................... 524/101; 252/400.1; 524/396; 524/400; 524/424; 524/425; 524/436; 524/492
[58] Field of Search ...................... 524/396, 400, 524/492, 425, 424, 101, 436; 252/400.1

[56] References Cited

U.S. PATENT DOCUMENTS

| | | |
|---|---|---|
| 3,396,132 | 8/1968 | Perry et al. . |
| 4,000,100 | 12/1976 | Baldyga .................................. 524/450 |
| 4,123,399 | 10/1978 | Gay . |
| 4,221,687 | 9/1980 | Minagawa et al. ..................... 524/537 |
| 4,371,656 | 2/1983 | Kashiwase et al. .................... 524/450 |
| 4,401,779 | 8/1983 | Bae ........................................ 524/399 |
| 4,661,544 | 4/1987 | Quinn ..................................... 524/399 |
| 4,861,816 | 8/1989 | Kobayashi et al. . |
| 4,950,704 | 8/1990 | Croce et al. . |
| 5,004,776 | 4/1991 | Tadenuma et al. ..................... 524/399 |
| 5,102,933 | 4/1992 | Bae et al. . |
| 5,216,058 | 6/1993 | Visneski ................................. 524/436 |
| 5,225,108 | 7/1993 | Bae et al. . |
| 5,252,645 | 10/1993 | Nosu et al. ............................. 524/399 |
| 5,322,872 | 6/1994 | Quinn ..................................... 524/399 |
| 5,350,785 | 9/1994 | Sander et al. .......................... 524/400 |

FOREIGN PATENT DOCUMENTS 51-74043  6/1976  Japan .

*Primary Examiner*—Veronica P. Hoke
*Attorney, Agent, or Firm*—Scully, Scott, Murphy & Presser

[57] ABSTRACT

PVC stabilizers containing an overbased mixture of salts, such as magnesium and zinc salts, of unsubstituted and/or alkyl-substituted benzoic acid and optionally one or more fatty aliphatic acids, which contain a carbonate and/or silicate stabilizer, and which preferably also contain one or more polyols containing 2 to 10 hydroxyl groups, exhibit significant and unexpected reduction in the tendency to volatilize and form "fog" upon exposure of the formulation to moderately elevated temperatures, without loss of other desirable stabilization properties.

5 Claims, No Drawings

OVERBASED PVC STABILIZER

BACKGROUND OF THE INVENTION

The present invention relates to stabilizer compositions for polyvinyl chloride resins and to polyvinyl chloride resin compositions having improved resistance to degradation caused by heat. Although capable of a variety of uses, this invention finds advantageous utility in providing improved long term stability at moderate temperatures to motor vehicle components shaped from polyvinyl chloride resin compositions, especially where the polyvinyl chloride resin compositions are used in combination with urethane.

The problem of imparting to polyvinyl chloride a sufficient heat processing stability at temperatures at which the polymer becomes sufficiently fluid or softened to permit shaping is of course of long standing, and has been satisfactorily resolved by addition to the polymer of various combinations of known heat stabilizers. At processing temperatures, the resin can degrade, liberating hydrogen chloride, and discolor, become brittle, and stick to the equipment. These problems are overcome by combining with the polymer before heat processing or during heat processing one or more of the well established and successful conventional heat stabilizers, such as, for example, organotin stabilizers and/or barium-cadmium or barium-zinc salt stabilizers.

Although the well established and successful conventional heat stabilizers provide effective stabilization to the polymer at elevated heat processing temperatures during standard processing, they may not provide effective stabilization to the polymer at lower more moderate temperatures after such heat processing. For example, protection against discoloration at moderate temperatures over long periods is a particular problem with motor vehicle components shaped from polyvinyl chloride resin compositions despite such compositions having contained conventional heat stabilizers during their heat processing. Depending upon their location in the vehicle, these components may be exposed to varied amounts of light, and also different rather high (above ambient) temperatures in use, and these differences can degrade motor vehicle components at differing rates. One result is the volatilization of one or more components, or of decomposition products therefrom, which condense as "fog" on interior surfaces such as the windows and windshield. Additionally, when polyvinyl chloride resin compositions are associated with a polyurethane foam backing, e.g. automobile instrument panels, glove compartments, door handles, arm and head rests, the amine from the urethane can contribute to discoloration of the polyvinyl chloride resin composition.

DISCUSSION OF THE PRIOR ART

A number of stabilizing systems have been proposed for imparting polyvinyl chloride resin articles molded with a polyurethane foam backing with resistance to deterioration from exposure to long term moderate heat and from exposure to an amine from urethane. For example, the art has recognized the use of perchlorate salts in polyvinyl chloride resin stabilization and in particular in stabilizing polyvinyl chloride that is used in contact with polyurethane foam or plastic. This art, however, does not address the problem of "fog" and does not suggest how to alleviate that problem. For, instance, European Patent Application No. 861111174.8 discloses polyvinyl chloride resin stabilizer compositions comprising a 2,2, 6, 6-tetramethyl piperidinyl compound and an ammonium or metal perchlorate. This publication also discloses the use of such stabilizer compositions for polyvinyl chloride resin articles molded with polyurethane foam backing.

U.S. Pat. No. 4,861,816 discloses polyvinyl chloride compositions containing a stabilizer mixture of certain barium/zinc carboxylic acid salts and a metal perchlorate and/or perchlorate ion type hydrotalcite. According to the '816 patent the perchlorate and perchlorate ion type hydrotalcite compound give excellent amine resistance, particularly to urethane attached polyvinyl chloride sheets. U.S. Pat. No. 5,225,108 also discloses the use of metal perchlorates in PVC stabilizers, but does not address how to remedy the formation of "fog".

Other patents disclose PVC stabilizers but do not address the problems of "fog" formation nor or interaction with polyurethane components. For instance, U.S. Pat. No. 3,396,132 and U.S. Pat. No. 5,102,933 disclose magnesium-zinc benzoate-stearate stabilizers with polyhydric alcohols and, in the case of U.S. Pat. No. 5,102,933, with beta-diketones. U.S. Pat. No. 4,950,704 also discloses the use of betadiketones for PVC stabilizers. None of these patents addresses the problem the tendency of the stabilized PVC to form "fog". U.S. Pat. No. 4,123,399 discloses combinations of beta diketones and polyhydric alcohols but it, too, does not suggest how to reduce the tendency of the stabilized PVC to form "fog".

There remains a need for PVC stabilizers which reduce the tendency of the stabilized PVC composition to form "fog" upon moderate heating, yet which retain heat stability and satisfactory processability in the stabilized PVC composition.

BRIEF SUMMARY OF THE INVENTION

The present invention satisfies the aforementioned objectives and affords as well the other advantages described herein.

One aspect of the present invention is a composition of matter useful as a thermal stabilizer for polyvinyl chloride resin and which exhibits a reduced tendency to volatilize when heated, comprising (a) a mixture of salts of one or more aromatic acids with two or more of calcium, magnesium, zinc and barium, which is overbased with one or more of said metals; in admixture with (b) a carbonate or silicate thermal stabilizer for polyvinyl chloride.

In preferred embodiments of this aspect of the invention, the aforesaid mixture also contains salts of two or more of said metals with an alkanoic or alkenoic acid containing at least about 18 carbon atoms, such as stearate. Other preferred embodiments contain non-fogging amounts of polyol, as defined herein, and/or a perchlorate stabilizer.

Another aspect of the present invention is polyvinyl chloride formulations stabilized against heat-mediated degradation and exhibiting a reduced tendency to volatilize upon exposure to moderate heat, comprising a polyvinyl chloride polymer and an effective amount of any of the foregoing compositions of matter. The present invention is particularly useful in the fabrication of shaped motor vehicle components, especially components comprising PVC and polyurethane.

DETAILED DESCRIPTION OF INVENTION

The reduced tendency of a polyvinyl chloride composition to form "fog" in use is also expressed herein as a reduced tendency of the composition to volatilize, by which is meant that the composition emits a reduced amount of, and preferably little or no, compounds into the ambient atmosphere when the composition is exposed to moderate heat, typically temperatures of about 60 to 130° C. (140 to 270° F.). Such compounds emitted by polyvinyl chloride compositions under such conditions can comprise one or more components of the polyvinyl chloride composition itself, products of the degradation of one or more components of the polyvinyl chloride composition, compounds formed by the reaction of any such emitted compounds or degradation products, or mixtures of any of the foregoing.

One component of the stabilizer composition of the present invention is an overbased mixture of metal salts of one or more aromatic acids. The metal salts are formed of two, or more, of the group consisting of calcium, magnesium, zinc, and barium. Preferably, barium is not present in the stabilizer composition at all, because of its reputed implication in health and environmental concerns. Also, it is preferred that the composition contains zinc. The term "aromatic acids" is used herein to mean benzoic acid wherein the phenyl ring either is unsubstituted, or is substituted with one, two or three alkyl groups each of which can contain 1 to 6 carbon atoms and can be straight or branched. Examples of such alkyl substituents include methyl, and tert-butyl. A preferred example of such a substituted benzoic acid is any toluic acid, such as meta-toluic acid. Mixtures of substituted and unsubstituted benzoic acid salts can also be used.

The mixture of salts may also include one or more salts of one or more fatty alkanoic and/or alkenoic aliphatic acids. Preferably, salts of such aliphatic acids are present, to impart increased lubricity. The fatty aliphatic acids useful in this component of the present invention have at least about 18 carbon atoms, up to about 30 carbon atoms. The preferred fatty aliphatic acid is stearate. Other useful fatty acids include lauric and behenic acids. The molar ratio of aromatic carboxylate to fatty aliphatic carboxylate, if present, can effectively lie in the range of 0.5:1 to about 2:1, preferably in the range of 0.8 to 1.2:1.

As indicated, the mixture of salts of aromatic acids, or salts of aromatic and fatty aliphatic acid(s), is overbased, by which is meant that the total amount of all of calcium, magnesium, zinc and barium present in said salt mixture exceeds the total amount of aromatic carboxylate and fatty aliphatic carboxylate present, on an equivalents basis. The degree of overbasing, that is, the ratio of (Ca+Mg+Zn+Ba present):(aromatic carboxylates and fatty aliphatic carboxylates present) (on an equivalents basis) is of course greater than 1:1, and can range up to about 1.8:1 and more preferably up to about 1.3:1. The ratio of (magnesium and calcium) to zinc present in this mixture can typically fall in the range of 0.5:1 to about 2:1, and preferably in the range of about 1.3:1 to about 1.5:1 on a mole basis.

The mixture of salts of aromatic carboxylates, and the preferred mixture of salts of aromatic plus alkanoic and/or alkenoic carboxylate, can be formed by any of various procedures familiar to those of ordinary skill in this art. One convenient procedure is to mix together the desired aromatic acid(s), the fatty aliphatic acid if desired, and the oxides of the desired metals (such as zinc oxide and magnesium oxide) in any order and then to heat the mixture until they are completely reacted. Alternatively, one can separately form individual salts, such as magnesium carboxylate (e.g. magnesium stearate) and zinc benzoate, and/or magnesium benzoate and zinc carboxylate (e.g. zinc stearate), and then combine these compounds with additional amounts of one or more metal compounds to provide the desired overbasing. Such compounds can be one or more of, for instance, magnesium oxide or magnesium hydroxide. Magnesium oxide is the preferred source of magnesium for overbasing the mixture in this manner.

A preferred procedure for preparing the mixture of salts is, first, to melt the aliphatic acid component and then gradually stir in zinc oxide, in a stoichiometric amount, under controlled heating conditions wherein zinc carboxylate is formed and side reaction products are minimized. This step is carried out free from magnesium, calcium and barium, and free from aromatic acids. Next, the desired one or more aromatic acids are added, followed by reactive compounds of the one or more other metals, such as magnesium oxide. At all times the temperatures are controlled to maintain fluidity and to minimize formation of side reaction products. Then the reaction product is heated under reduced pressure, to remove as volatiles byproducts which could contribute to formation of "fog" from the PVC compounds.

The stabilizer compositions of the present invention also include a carbonate or silicate component which is a heat stabilizer for the polyvinyl chloride. Examples of such compounds abound and are well known in the field. Preferred examples include inorganic metal silicates such as mono-or condensed silicates of sodium, calcium, magnesium, aluminum, and zinc. Other preferred examples include dimetallic and polymetallic carbonates and silicates, such as magnesium aluminum carbonate, a particularly preferred example of which is hydrotalcite (corresponding to the formula $Mg_{1-x}Al_x(OH)_2(CO_3)_{x/2} \cdot mH_2O$ wherein x is between 0 and 1). Yet other preferred examples include sodium aluminum silicates, and calcium aluminum silicates, especially zeolites.

Another component of the stabilizer compositions of the present invention, which is optional but preferred, is a polyol component comprising one or more polyol compounds containing 2 to 10 hydroxyl groups. The polyols useful in this invention contain generally 2 to 20 carbon atoms, and may contain 1 or more hetero atoms such as, especially, one or more nitrogen atoms. Examples of suitable polyol compounds include ethylene glycol, propylene glycol, glycerol, sorbitol, mannitol, xylitol, pentaerythritol, dipentaerythritol, tripentaerythritol, and tris (2-hydroxyethyl) isocyanurate, which latter compound is a preferred polyol in the practice of this invention.

To achieve the desired combination of properties using a stabilizer of the present invention, the one or more polyols comprising the aforementioned polyol component should be present in such an amount that the polyols do not cause the stabilizer to exhibit increased fogging. By this is meant that the polyol should not volatilize at all, or it should not volatilize to such an extent that it negates the effect of the overbasing in reducing the overall tendency of the stabilizer to cause fogging. Subject to this consideration, the ratio by weight of the overbased mixture of salts to the amount of the one or more polyols present is generally in the range of about 1:1 to about 2:1, and more preferably about 1.5:1 to about 2:1. The polyol tris(2-hydroxyethyl) isocyanurate is particularly preferred because of its low fogging behavior.

It has been determined that the presence of the additional overbasing amount of magnesium, or other metal, beyond the amount necessary to achieve neutralization of the aromatic carboxylate and of any fatty alkanoic and/or alkenoic carboxylate present, provides a significant and unexpected improvement in that the stabilizer composition exhibits a greatly reduced tendency to cause "fogging" (that is, a reduced tendency to volatilize when heated to moderately elevated temperatures). In addition, the polyol component contributes improved heat processing stability without contributing to windshield fogging, that is, without contributing to volatilization of the stabilizer component. Furthermore, these stabilizer compositions contribute, to polyvinyl chloride resin compositions containing these compositions, satisfactory stability against heat-mediated degradation and satisfactory processing stability. The overbased carboxylate composition does not detract from the stability against heat-mediated degradation and processing stability of the polyvinyl chloride formulations containing this stabilizer.

The stabilizer compositions of the present invention preferably include one or more optional but preferred constituents. One such constituent is a beta-diketone component comprising one or more beta-diketones having the structural formula $R^1$—C(O)—$CH_2$—C(O)—$R^2$ wherein $R^1$ is alkyl having about 10 to about 30 carbon atoms, and $R^2$ is phenyl, phenyl substituted with up to 3 lower ($C_1$–$C_6$) alkyl groups, or alkyl containing 1 to 30 carbon atoms.

Examples of suitable beta-diketones include benzoylacetone, lauroylbenzoylmethane, myristoylbenzoylemethane, palmitoylbenzoylmethane, stearoylbenzoylmethane, behenoylbenzoylmethane, dilauroylmethane, dimyristoylmethane, dipalmitoylmethane, distearoylmethane, dibehenoylmethane, lauroylmyristoylmethane, lauroylpalmitoylmethane, lauroylstearoylmethane, lauroylbehenoylmethane, myristoylpalmitoylmethane, myristoylstearoylmethane, myristoylbehenoylmethane, palmitoylstearoylmethane, palmitoylbehenoylmethane, stearoylbehenoylmethane, lauroyl toluyl methane, stearoyl toluyl methane, lauroyl xyloyl methane, stearoyl xyloyl methane, 1-phenyltriacontane-1, 3-dione, acetyltetralone, palmitoyltetralone, stearoyltetralone, palmitoylcyclohexanone, stearoylcyclohexanone and (paramethoxybenzoyl)-stearoylmethane. These compounds are utilized in amounts of between about 0.05 and 5% by weight relative to the weight of the PVC and, preferably, between about 0.1 and 1% by weight.

It is also advantageous to include in the stabilizer compositions of the present invention, and in polyvinyl chloride products containing the stabilizer compositions, a perchlorate component comprising one or more perchlorate compounds. Examples include metal-perchlorate salts such as barium perchlorate, magnesium perchlorate, aluminum perchlorate, sodium perchlorate, calcium perchlorate, and the like. Other examples include the sodium perchlorate/calcium silicate composition disclosed in U.S. Pat. No. 5,225,108, the disclosure of which is hereby incorporated herein by reference. Other examples include perchlorate-derivatized hydrotalcite compounds such as those disclosed in U.S. Pat. No. 4,861,816, the disclosure of which is hereby incorporated herein by reference. The latter compounds are said to correspond to the formula $Mg_{1-x}Al_x(OH)_2.(ClO_4)_2.mH_2O$ wherein m represents a positive number and x is greater than 0 and is less than or equal to 0.5.

The perchlorate helps to retard or prevent discoloration and chemical interaction between polyvinyl chloride and adjacent polyurethane materials, such as encountered in shaped automobile parts. Parts can be "adjacent" yet subject to such undesired interaction if they are in physical contact with each other or if they are near each other, not touching, such that an amine byproduct from the polyurethane volatilizes and comes into contact with the polyvinyl chloride formulation. The one or more perchlorate compounds are preferably present in an amount which is about 10 to about 40 wt. % of the stabilizer composition, and more preferably about 15 to about 35 wt. % of the stabilizer composition.

The stabilizer compositions of the present invention are preferably used to advantage in combination with vinyl halide resins, preferably polyvinyl chloride resins. The term "polyvinyl chloride" as used herein is inclusive of any polymer formed at least in part of the recurring group (—CHCl—$CX_2$—)$_p$ and having a chlorine content in excess of 40%. In this formula, each of the X groups can be either hydrogen or chlorine, and p is the number of units in each polymer chain. In polyvinyl chloride homopolymers, each of the X groups is hydrogen. Thus, the terms, "PVC" and "polyvinyl chloride" include not only polyvinyl chloride homopolymers but also after—chlorinated polyvinyl chlorides, as well as copolymers of vinyl chloride in a major proportion with other copolymerizable monomers in moderate proportion such as copolymers of vinyl chloride and vinyl acetate, copolymers of vinyl chloride with maleic or fumaric acids or esters, and copolymers of vinyl chloride with styrene. The stabilizer compositions are effective also with mixtures of polyvinyl chloride in major proportion with a minor proportion of other synthetic resins such as chlorinated polyethylene or copolymers of acrylonitrile, butylene and styrene.

Stabilizer compositions of the present invention can be used with plasticized polyvinyl chloride resin compositions of conventional formulation. Conventional plasticizers well known to those skilled in the art can be employed such as, for example, dioctyl phthalate, octyl diphenylphosphate, and epoxidized soybean oil. Particularly useful plasticizers are the epoxidized esters having form 20 to 150 carbon atoms.

The stabilizer compositions of the present invention are used in small amounts effective to impart resistance to heat-mediated deterioration of the PVC or other polyvinyl chloride resin. That is, "heat-mediated deterioration" includes deterioration which is due to exposure to excessive heat, as well as deterioration which is initiated or accelerated by exposure to heat. Effective heat stability is afforded generally by adding about 0.5 to about 5 phr (parts by weight per hundred parts by weight of the polyvinyl chloride) of the stabilizer. Preferred amounts are generally in the range of about 1 to about 4 phr. The stabilizer can be compounded into the resin formulation in accordance with conventional compounding techniques abundantly familiar to one of ordinary skill in this art, wherein the stabilizer is finely divided so as to aid its dispersibility into the resin and is then dispersed therein by physical mixing means.

The stabilized polyvinyl chloride resin composition comprising these components can also contain conventional additional additives such as antioxidants, lubricants, flame retardants, fillers, pigments, UV absorbers and the like, in relative amounts effective to fulfill the desired functions of each such ingredient. These ingredients can be added, if desired, prior to, during, or subsequent to the step in which the heat stabilizer composition of the present invention is compounded into the polyvinyl chloride composition.

Among the preferred antioxidants are phenolics, generally used in amounts up to about 0.5 wt. % of the polyvinyl chloride resin composition, such as 2,6-di-t-butyl-4-methylphenol, 2-t-butyl-4-methoxyphenol, 3-t-butyl-4-methoxyphenol, n-propylgallate, n-dodecylgallate, dilauryl thiodipropionate, and the like.

Each of the starting materials used herein, whether intended to be reactants or as unreacting additives, should be provided in a high-purity form, preferably 97% or higher purity, and free of existing volatilized contaminants.

The invention is further described in the following examples, which are included for purposes of illustration and not for limitation of the scope of that which the applicants consider to be the invention.

EXAMPLE 1

A stabilizer composition was made by, first, stirring together the following components in the amounts indicated in Table 1-A:

TABLE 1-A

| Component | Amount (lb.) | Amount (wt. %) |
|---|---|---|
| Stearic acid | 1143 | 57.6 |
| Benzoic acid | 247 | 12.4 |
| Water | 20 | 1.0 |
| Zinc oxide | 165 | 8.3 |
| Meta-toluic acid | 276 | 13.9 |
| Magnesium oxide (periclase) | 136 | 6.8 |

Periclase is the highly preferred form of magnesium oxide for purposes of this invention.

This mixture was formed in a stirred tank reactor held at 190°–199° C. under a vacuum of 150 mm Hg while sparging with nitrogen, until reaction was complete.

The reaction product was then stirred together under moderate heating with hydrotalcite, zeolite and polyol, in the amounts indicated in Table 1-B:

TABLE 1-B

| Component | Amount (wt. %) |
|---|---|
| Reaction product | 30.0 |
| Hydrotalcite ("Alcamizer 2", Kyowa Chemical Industry Co.) | 25.0 |
| Zeolite A | 25.0 |
| Tris (2-hydroxyethyl) isocyanurate | 20.0 |

The resulting stabilizer composition was tested for its ability to impart heat stabilization, and for resistance to fogging, and was compared to another non-overbased heat stabilizer.

EXAMPLE 2

A test formulation was prepared containing 100 parts by weight of a PVC/ABS/nitrile rubber compound, 1.8 parts by weight of a sodium perchlorate stabilizer, and 2.2 parts by weight of either (A) a conventional PVC heat stabilizer containing barium and zinc, not overbased, or (B) the stabilizer composition prepared in Example 1. Portions of the respective compounds were milled at 350° F. for 5 minutes, formed into sheeting, and then tested.

Heat Stability: Samples were cut from each sheet and heated in an oven at 350° F., and at 400° F. To follow the progress of any deterioration of the samples (as evidenced by, for instance, discoloration, embrittlement, or otherwise), samples were withdrawn from the 350° F. oven every 15 minutes and from the 400° F. oven every 10 minutes.

The samples that were subjected to heating at 350° F. progressively darkened over time. The samples containing the stabilizer according to the present invention made in Example 1 did not darken as much at any point in time as the samples containing the non-overbased barium/zinc stabilizer. In the samples that were heated at 400° F., those which did not contain the stabilizer of Example 1 darkened more than those which contained the stabilizer of Example 1, and the greater degree of darkening was even more noticeable at each point in time, even after only 10 minutes of heating and thereafter.

Fogging Reduction: Samples were cut from each of the aforementioned sheets and were conditioned and then tested by a standardized procedure for measuring fogging. The samples were conditioned by holding them for one hour at a constant relative humidity of 49.7% and a constant temperature of 70° F. Then, each sample was placed in a separate isothermal container on which a clean, clear glass plate served as a lid. The samples were held at 100° C. in the isothermal container for 3 hours, during which time the glass plate was maintained at 21° C. Light reflectivity of the glass plate before and after the test was compared as a measure of the amount of material which volatilized from the sample and condensed on the plate. The reflectivity after the test is expressed as a "fog number" which is the percentage of the reflectivity before the test, so that a higher fog number correlates with less volatilization from the sample and an accordingly better performance by the stabilizer in lessening volatilization.

The samples stabilized with the stabilizer according to the present invention made in Example 1 had a fog number of 96, whereas the samples stabilized with the non-overbased stabilizer had a fog number of 94. This constitutes a significant reduction in volatilization, and is attributable to the presence of the stabilizer of the present invention.

EXAMPLE 3

Polymer formulations containing PVC were prepared containing 88 parts by weight polymer, 12 parts by weight processing aid ("Chemigum B"), 1.8 parts by weight sodium perchlorate stabilizer, and 2.2 parts by weight of one of the following four heat stabilizers:

A) A non-overbased barium-zinc stabilizer

B) An overbased mixture of magnesium and zinc benzoate and stearate, containing no polyol.

C) The same as in B) but also containing tris(2-hydroxyethyl) isocyanurate.

D) The same as in C) but in which meta-toluate replaced half of the benzoate.

The formulations were milled, sheeted, and cut into samples, placed in ovens held at 350° F. and at 375° F., and periodically withdrawn, as set forth in Example 2.

Samples made with stabilizers C) and D) behaved similiarly to each other. Compared to samples with stabilizer B) and with stabilizer A), both were slightly superior at 350° F. and both were noticably superior after even brief heating at 375° F.

Samples of each formulation were also placed in contact with polyurethane foam and held in an oven at 250° F. for 21 days, during which time samples were periodically withdrawn from the oven and compared (the degree of darkening correlated to the degree of unwanted interaction between PVC and polyurethane). As in the heat stability tests, formulations made with stabilizer C) and D) were similar to each other, and were both slightly superior to formulations with stabilizer B), which was similar to formulations with stabilizer A).

Samples of each formulation were tested for fogging using the test procedure described in Example 2. The results are set forth in Table 3-A.

TABLE 3-A

| Stabilizer in the Formulation | Fog No. |
|---|---|
| A | 91 |
| B | 93 |
| C | 96 |
| D | 93 |

These data indicate that stabilizers in accordance with the present invention imparted a significant reduction in the tendency of the formulation to emit "fog".

What is claimed is:

1. A composition of matter useful as a thermal stabilizer for polyvinyl chloride resin and which exhibits a reduced tendency to volatilize when heated, comprising:

(a) a mixture of salts of two or more aromatic acids and of one or more alkanoic or alkenoic aliphatic acids containing at least 18 carbon atoms with magnesium and zinc which is overbased with one or more of said metals, wherein said mixture of aromatic acids and aliphatic acids in such that the molar ratio of aromatic acids to aliphatic acids is from about 0.5:1 to about 2:1; in mixture with (b) a carbonate or silicate thermal stabilizer for polyvinyl chloride which is present in an effective amount of up to about 63% by weight of the sum of (a+b); and (c) optionally, at least one inorganic perchlorate salt, polyol containing 2 to 10 carbon atoms, beta-diketone or mixtures thereof.

2. A composition of matter according to claim 1 wherein said aliphatic acid is stearate.

3. A composition of matter according to claim 1 further comprising tris (2-hydroxyethyl) isocyanurate.

4. A composition of matter according to claim 1 wherein said carbonate or silicate thermal stabilizer is selected from the group consisting of monometallic and dimetallic silicates and carbonates of sodium, calcium, magnesium, aluminum and zinc.

5. A polyvinyl chloride resin composition which comprises polyvinyl chloride resin and a heat stabilizing effective amount of a stabilizer according to claim 1.

* * * * *